United States Patent
Marshall et al.

(10) Patent No.: US 7,787,386 B1
(45) Date of Patent: Aug. 31, 2010

(54) METHOD AND SYSTEM FOR SELF-TESTING A LINE CARD

(75) Inventors: Robert A. Marshall, Georgetown, TX (US); James R. Sisk, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 2723 days.

(21) Appl. No.: 10/025,599

(22) Filed: Dec. 18, 2001

(51) Int. Cl.
 H04L 12/26 (2006.01)
(52) U.S. Cl. .................. 370/244; 370/247; 370/252; 379/15.01; 379/26.02
(58) Field of Classification Search ............ 370/498, 370/524, 433, 468, 494, 495, 248, 484, 487, 370/229, 477, 251, 250, 356, 398, 422, 489, 370/321, 326, 337, 395, 397, 399, 401, 404, 370/409, 396, 425, 442, 352, 486, 493, 496, 370/503, 509, 522, 537, 538, 540, 336, 347, 370/470; 379/377, 382, 383, 384, 380, 398, 379/399.01, 413, 412, 413.02, 414, 26.02, 379/373, 418, 252, 399
See application file for complete search history.

(56) References Cited

U.S. PATENT DOCUMENTS

| | | | | |
|---|---|---|---|---|
| 5,111,497 A * | 5/1992 | Bliven et al. | ............ | 379/27.01 |
| 5,559,440 A * | 9/1996 | Lopresti et al. | ............ | 324/607 |
| 5,596,322 A * | 1/1997 | Marsh et al. | ............ | 341/120 |
| 5,598,455 A * | 1/1997 | Bliven et al. | ............ | 379/22.04 |
| 5,974,363 A * | 10/1999 | Gammel et al. | ............ | 702/117 |
| 5,991,311 A | 11/1999 | Long et al. | ............ | 370/524 |
| 6,044,107 A * | 3/2000 | Gatherer et al. | ............ | 375/222 |
| 6,078,593 A * | 6/2000 | Eames et al. | ............ | 370/498 |
| 6,192,109 B1 * | 2/2001 | Amrany et al. | ............ | 379/30 |
| 6,219,417 B1 * | 4/2001 | Zhou | ............ | 379/377 |
| 6,229,814 B1 * | 5/2001 | McMillian et al. | ............ | 370/420 |
| 6,404,861 B1 | 6/2002 | Cohen et al. | ............ | 379/93.01 |
| 6,407,997 B1 | 6/2002 | DeNap et al. | ............ | 370/352 |
| 6,532,215 B1 * | 3/2003 | Muntz | ............ | 370/242 |
| 6,574,333 B1 * | 6/2003 | Manchester et al. | ............ | 379/377 |
| 6,580,727 B1 | 6/2003 | Yim et al. | ............ | 370/463 |
| 6,625,238 B2 * | 9/2003 | Wieck | ............ | 375/349 |
| 6,640,239 B1 | 10/2003 | Gidwani | ............ | 709/203 |
| 6,847,702 B1 * | 1/2005 | Czerwiec et al. | ............ | 379/29.01 |
| 6,850,618 B1 | 2/2005 | Mohajeri et al. | ............ | 379/399.01 |
| 6,876,725 B2 | 4/2005 | Rashid-Farrokhi et al. | . | 379/1.04 |
| 6,891,803 B1 * | 5/2005 | Chang et al. | ............ | 370/252 |
| 6,909,781 B1 * | 6/2005 | Itri | ............ | 379/399.01 |
| 6,965,657 B1 | 11/2005 | Rezvani et al. | ............ | 375/346 |
| 7,031,446 B2 * | 4/2006 | Wilson et al. | ............ | 379/93.29 |
| 7,061,857 B2 * | 6/2006 | Norrell et al. | ............ | 370/216 |
| 7,180,867 B2 * | 2/2007 | Hoch et al. | ............ | 370/244 |
| 2002/0118819 A1 * | 8/2002 | Li | ............ | 379/399.01 |

(Continued)

*Primary Examiner*—Michael J Moore, Jr.
(74) *Attorney, Agent, or Firm*—Baker Botts L.L.P.

(57) ABSTRACT

According to one embodiment of the invention, a method for self-testing a portion of a line card having a digital signal processor for manipulating data received by the line card, and a transmit channel and a receive channel coupled to a combined transmit and receive channel includes transmitting a test signal through at least a portion of the transmit channel toward the combined channel and detecting, by the digital signal processor any resulting signal in the receive channel to determine whether any components in the transmit channel, receive channel or combined channel are malfunctioning.

41 Claims, 2 Drawing Sheets

U.S. PATENT DOCUMENTS

| | | | |
|---|---|---|---|
| 2002/0131436 A1 | 9/2002 | Suri | 370/419 |
| 2002/0172329 A1 | 11/2002 | Rashid-Farrokhi et al. | 379/22.02 |
| 2003/0021391 A1 | 1/2003 | Rubin et al. | 379/22.04 |
| 2003/0035471 A1 | 2/2003 | Pitsoulakis | 375/222 |
| 2003/0053443 A1 | 3/2003 | Owens | 370/352 |
| 2005/0122916 A1 | 6/2005 | Rubin et al. | 370/293 |
| 2005/0265338 A1 | 12/2005 | Chapman et al. | 370/389 |
| 2005/0265397 A1 | 12/2005 | Chapman et al. | 370/490 |

* cited by examiner

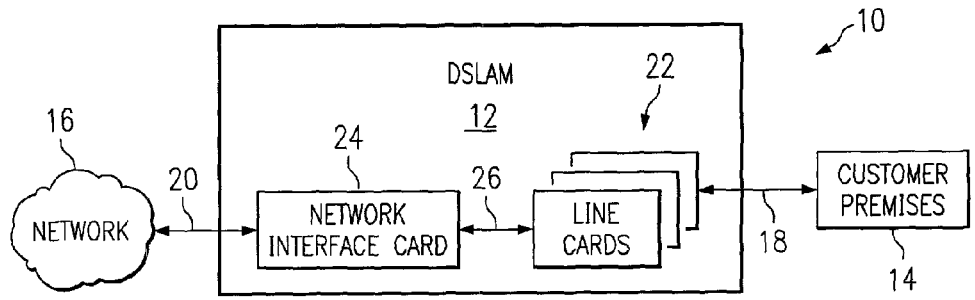
FIG. 1
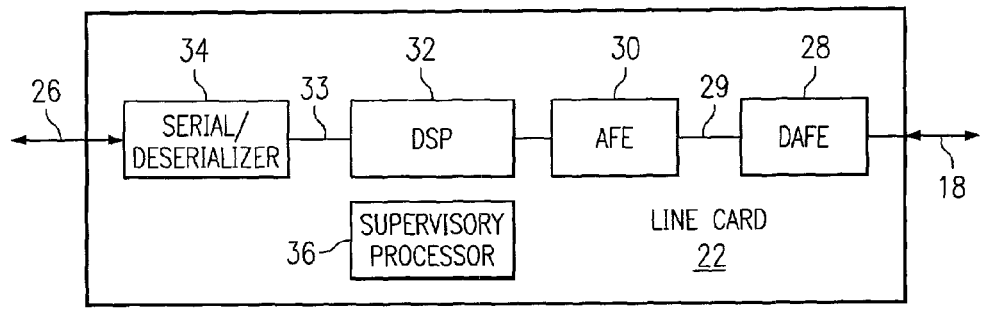
FIG. 2
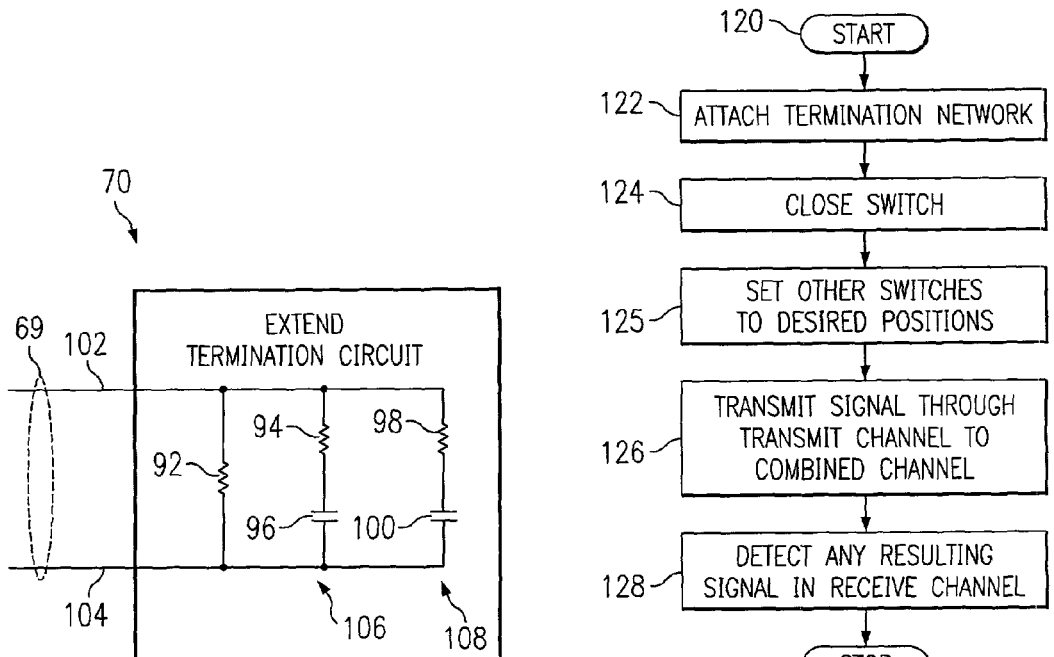
FIG. 4
FIG. 5

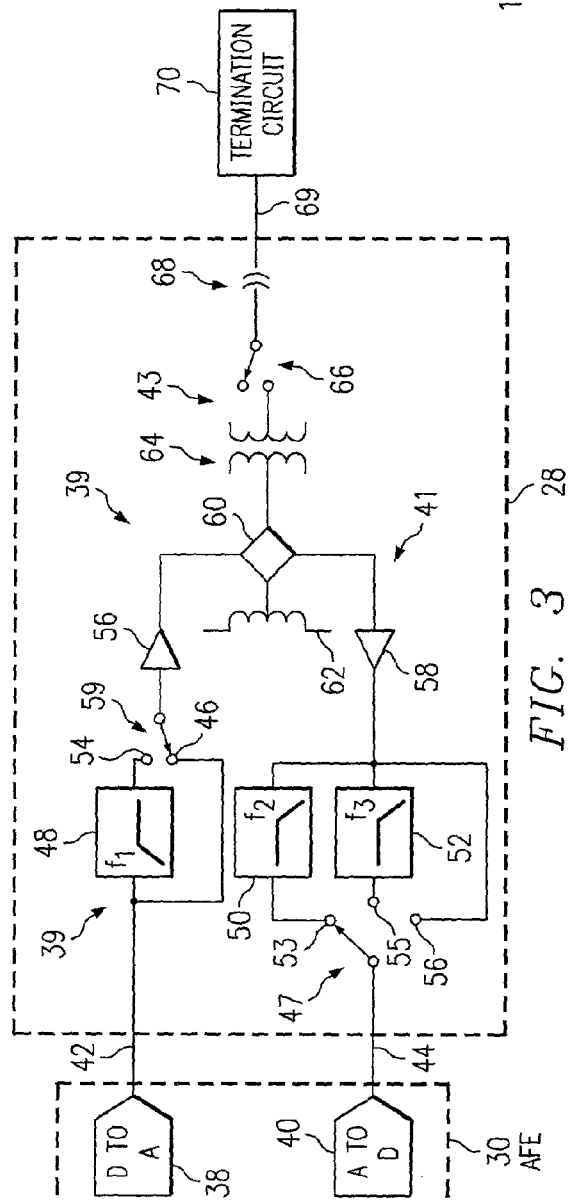
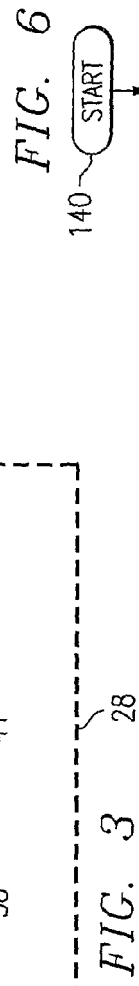
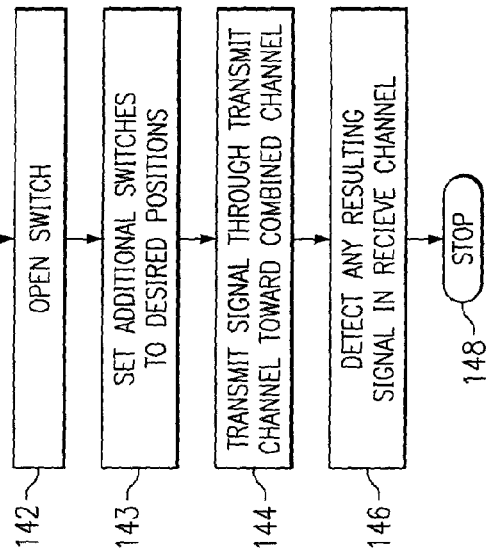

US 7,787,386 B1

METHOD AND SYSTEM FOR SELF-TESTING A LINE CARD

TECHNICAL FIELD OF THE INVENTION

This invention relates generally to telecommunications and more particularly to a method and system for self-testing a line card.

BACKGROUND OF THE INVENTION

Communication systems that allow communication of data from a home or office through a wide area network are widely used. Enabling infrastructure for such communications, and others, often includes a digital subscriber line access multiplexer (DSLAM). A DSLAM includes a plurality of line cards. A line card refers to an integrated circuit card disposed in the DSLAM. A line card includes one or more modems for converting data received from a customer's home or office to a format suitable for transmission over the Internet and for formatting data received from the Internet for transmission to a customer's home. Such line cards include a plurality of electrical components, many of which require testing before sale or use of the line card.

Testing of such components is often difficult or expensive both due to the number of components to be tested as well as expensive equipment conventionally required. For example, a frequency analyzer is sometimes used to perform a filter sweep, in which a plurality of signals at varying frequencies are transmitted through the line card and the resulting signals are measured with a frequency analyzer. Such procedure is both time consuming and expensive, particularly because a frequency analyzer is an expensive piece of equipment. Expense also arises from the manpower required in such a time consuming procedure.

SUMMARY OF THE INVENTION

According to one embodiment of the invention, a method for self-testing a portion of a line card having a digital signal processor for manipulating data received by the line card, and a transmit channel and a receive channel coupled to a combined transmit and receive channel includes transmitting a test signal through at least a portion of the transmit channel toward the combined channel and detecting, by the digital signal processor any resulting signal in the receive channel to determine whether any components in the transmit channel, receive channel or combined channel are malfunctioning.

Some embodiments of the invention provide numerous technical advantages. Other embodiments may realize some, none, or all of these advantages. For example, according to one embodiment, a line card can be easily self-tested without the use of expensive equipment. Furthermore, a normally time-consuming process may be shortened.

Other advantages may be readily ascertainable by those skilled in the art from the following figures, descriptions and claims.

BRIEF DESCRIPTION OF THE DRAWINGS

For a more complete understanding of the invention, reference is now made to the following description taken in conjunction with the accompanying drawings, wherein like reference numerals represent like parts, in which:

FIG. 1 is a block diagram of a telecommunications system that may benefit from the teachings of the invention;

FIG. 2 is a block diagram of a line card of the telecommunications system of FIG. 1, which may be tested according to the teachings of the invention;

FIG. 3 is a schematic diagram showing additional details of portions of the line card of FIG. 2 and an associated termination circuit;

FIG. 4 is a circuit diagram showing additional details of the termination circuit of FIG. 3;

FIG. 5 is a flow chart showing example steps associated with a method for self-testing a line card according to one embodiment of the invention; and FIG. 6 is a flow chart showing example steps associated with a method for self-testing a line card according to another embodiment of the invention.

DETAILED DESCRIPTION OF EXAMPLE EMBODIMENTS OF THE INVENTION

Example embodiments of the invention are best understood by referring to FIGS. 1 through 6 of the drawings, like numerals being used for like and corresponding parts of the various drawings.

FIG. 1 is a block diagram of a telecommunications system 10 that may benefit from the teachings of the invention. Telecommunications system 10 includes a DSLAM 12 that couples a customer premises 14 to a network 16. Customer premises 14 represents a user's home or office or other location in which a user may connect to a network, such as the Internet, through telephone lines, or other media. Network 16 represents any local area or wide area network that may be connected to by customer premises 14, such as the Internet. In the example, telephone lines 18 couple customer premises 14 to DSLAM 12; however, other types of media may be used to couple customer premises 14 to DSLAM 12. Telephone line 18 may comprise a tip portion and a ring portion (not explicitly shown in FIG. 1). DSLAM 12 is coupled to network 16 by a communication line 20. Communication line 20 may be an optical, electrical, or wireless communication link operable to couple a DSLAM to a network.

DSLAM 12, in this embodiment, comprises a plurality of line cards 22 and a network interface card 24 coupled by a communication link 26. Line cards 22 comprise one or more modems (not explicitly shown) that perform functions associated with converting signals received from customer premises 14 over telephone lines 18 into a format that is suitable for transmission to network 16 and with converting signals received from network 16 through network interface card 24 into a format that is suitable to transmission to customer premises 14. an example line card 22 that may benefit from the teachings of the invention is available from Cisco Systems; however, other line cards may also be tested according to the teachings of the invention. Network interface card 24 receives such signals and coordinates transmission of a plurality of signals intended for, or received from, line cards 22 that are generated by, or intended for, network 16.

According to the teachings of the invention, line cards 22 may be self-tested, allowing more rapid and less expensive testing of such devices than some conventional methods. Details associated with such a testing method are described below in conjunction with FIGS. 2 through 6.

FIG. 2 is a block diagram showing additional details of one example line card 22 of FIG. 1. As described above, line card 22 receives signals from customer premises 14 over telephone lines 18 and produces signals over line 26 suitable for transmission to network 16, and also received signals from network 16 over line and produces signals suitable for transmission to customer premises 14. Line card 22 includes, in this example, a discrete analog front end 28. Discrete analog front end 28 couples to an analog front end 30 by line 29. Line card 22 also may include a digital signal processor 32 coupled to a serializer/deserializer 34, as well as a supervising processor 36. These example components are shown for example purposes only, and the teachings of the invention may be utilized with other suitable combinations of circuitry.

In this example, discrete analog front end 28 comprises a set of components that receives analog signals over line 18 from customer premises 14 (receive signals) for further communication to network 16. Discrete analog front end 28 also receives analog signals (transmit signals) over line 29 for communication to customer premises 14. Discrete analog front end 28 selects an appropriate receive or transmit signal and forwards it in the correct direction. In addition, discrete analog front end may filter out-of-band frequencies that may be associated with signals transmitted in the opposite direction of the desired signals. In addition, discrete analog front end 28 may provide gain for such transmit and receive signals. Discrete analog front end 28 is described in greater detail in conjunction with FIG. 3.

Analog front end 30 receives incoming signals over line 29 from discrete analog front end 28 (receive signals) and converts those signals to a digital format for transmission to digital signal processor 32. Conversely, analog front end 30 receives digital signals outgoing (transmitted, signals) from digital signal processor 32 and converts the signals into an analog form for transmission to discrete analog front end 28. Any suitable combination of hardware and/or software may be utilized, including conventional techniques, for performing such digital-to-analog and analog-to-digital conversion.

Digital signal processor 32 receives incoming digital signals from analog front end 30 and outgoing digital signals from serializer/deserializer 34. The signals may be processed according to conventional techniques to perform any necessary modulation, demodulation, error correction, filtering, frequency analysis and other functions associated with line card 22. The teachings of the invention are equally applicable to line cards including yet to be developed digital signal processors and associated functions. Digital signal processor 32 may also examine signals it received during testing to determine if portions of line card 22 are operating properly, as described in greater detail below. Although other formats may be used, a digital multiline-based DSL is very adept at performing spectrum analyzer functions. As part of its normal operations, it performs a Fast Fourier Transform to break a received signal down into a plurality of bins. Utilizing digital signal processor 32 to examine signals during testing allows testing of portions of line card 22 without the use of expensive test equipment.

Serializer/deserializer 34 receives outgoing signals over line 26 and incoming signals from digital signal processor 32. Generally, serializer/deserializer 34 converts signals received from network 16 from a serial format to a desired format for receipt by digital signal processor 32, such as a Utopia format. In one embodiment, link 33 coupling serializer/deserializer 34 to digital signal processor is a Utopia bus. Conversely, serializer/deserializer deserializes signals received over communication link 33 and transmits them in a serial format over line 26 to network interface card 24.

Supervisor processor 32 may supervise the operations of the other components of line card 22 (connections not explicitly shown.)

According to the teachings of the invention, portions of analog front end 30 and discrete analog front end 28 may be self-tested in a simpler and less expensive manner than some conventional techniques. Although the following description describes certain components associated with analog front end and discrete analog front end 28 being tested, both components additional to those described as well as components of other portions of line card 22 may also benefit from the teachings of the invention. Additional details of such testing are described below in conjunction with FIGS. 3 through 6.

FIG. 3 is a schematic diagram illustrating additional detail of portions of analog front end 30 and discrete analog front end 28. In this example, analog front end 30 comprises a digital-to-analog converter 38 and an analog-to-digital converter 40. Digital-to-analog converter 38 generates an analog signal on line 42 from digital signals received by analog front end 30. Conversely, analog-to-digital converter 40 generate a digital signal for transmission to digital signal processor 32 in response to a signal received over line 44.

In this example, discrete analog front end 28 comprises a transmit channel 39, a receive channel 41, and a combined transmit and receive channel 43. In this example, transmit channel 39 generally conditions the analog signal at line 42 into an appropriate format for transmission for eventual receipt by a customer premises 14; however, as used herein, "transmit channel" generally refers to an outgoing channel of communication for signals destined for customer premises 14. In contrast, in this example, receive channel 41 generally conditions a received signal for eventual transmission over communication link 20 to network 16. As used herein, "transmit channel" generally refers to an incoming channel of communication over which signals are received for eventual transmission to network 16. Combined network and received channel 43 operates on both transmit and receive signals, as needed, and provides such signals either to receive channel 41 or customer premises 14. As used herein, "combined channel" refers to a communication channel through which both outgoing and incoming signals flow.

Transmit channel 39 comprises, in this example, a filter 48. Filter 48, in this example, is a high pass filter allowing transmission of only certain frequencies above a certain corner frequency $f_1$. The output of filter 48 is provided at node 54. A switch 59 allows bypassing of filter 48 by switching switch 59 to a node 46. This allows a transmitted signal to bypass filter 48, thus transmitting all frequency bands present on line 42. Transmit channel 39 also includes an amplifier 56 for amplifying the transmit signal for eventual transmission to a customer premises 14.

Receive channel 41 comprises, in this example, an amplifier 58 for amplifying a received signal for eventual transmission through analog-to-digital converter 40 to network 16. Receive channel 41 also comprises one or more filters 50, 52. Such filters may be associated with particular types of modulation associated with line card 22. For example, filter 50 may be associated with a frequency plan of discrete multitone modulation while filter 52 may be associated with carrierless amplitude modulation. As illustrated, filters 50 and 52 are low-pass filters allowing transmission of received signals, which should be generally lower frequencies. The output of filter 50 is coupled to a node 53. The output of filter 52 is coupled to a node 55. A node 56 is coupled to the output of amplifier 58, providing a bypass of filters 50 and 52. A switch 47 may allow selective coupling of the input of analog-to-digital converter 40 to either nodes 53, 55, or 56.

Transmit channel 39 and receive channel 41 may be coupled to combined transmit and receive channel 43 by a hybrid 60. Hybrid 60 separates the transmit signals from the received signals and appropriately directs such signals along combined channel 43 or to receive channel 41. Associated with hybrid 60 may be an impedance 62 for matching the impedance associated, in this example, with telephone lines 18. A combined channel 43 may include, a transformer 64, a switch 66, and a connector 68. Transformer 64 transforms signals received from customer premises 14 into appropriate voltage levels for continued processing by line card 22 and conversely transmits signals transmitted by line card 12 into appropriate voltage levels for transmission for receipt by customer premises 14. Switch 66 allows selective coupling of transformer 64, and the remainder of line card 12, to either a termination circuit 70 or customer premises 14, when closed, or an open circuit when open. When placed in an open position, as shown, switch 66 may also allow coupling of customer premises 14 to a redundant line card (not explicitly shown). The redundant line card may be used when it is determined that line card 22 is not functioning properly. Connector 68 may be any suitable connection for coupling line card 22 to an incoming telephone line 18.

Also shown in FIG. 3 is termination circuit 70. According to the teachings of the invention, termination circuit 70 has, in one embodiment, an impedance that is approximately the characteristic impedance of telephone line 18 coupled with customer premises 14. As described in greater detail below, the use of termination circuit 70 facilitates self-testing of line card 12.

In normal operation (non-test mode), incoming receive signals are received through connector 68, through switch 66, through transformer 64, and are directed by hybrid 60 through receive channel 41, including amplifier 58. Amplifier 58 amplifies the received signal to appropriate levels. The amplified receive signal then goes through either filter 50 or filter 52, depending on the type of modulation used. The output of the appropriate filter is then provided to analog-to-digital converter 40 for conversion to digital format and subsequent transmission to digital signal processor 32. Once reaching digital signal processor 32, the received signal may demodulated, filtered, error corrected, and otherwise upgraded for eventual transmission through serializer/deserializer 34 to network 20.

For transmitted signals, transmitted by line card 22 for receipt by customer premises 14, the signal to be transmitted is received by digital-to-analog converter 38 where it is converted to analog format and outputted on line 42. This signal is transmitted through transmit channel 39, including through filter 48 and then amplifier 56. Hybrid 60 directs the transmitted signal to transformer 64, as opposed to receive channel 41. Transformer 64 converts the transmitted signal to appropriate voltage levels where it flows through switch 66 and connector 68 to a customer premises 14.

In order to self-test certain components of line card 22, termination circuit 70 may be coupled to connector 68, in one mode of operation, rather than customer premises 14. Once termination circuit 70 is coupled to connector 68, the procedure described with respect to FIG. 5 may be used to test various components of line card 22.

FIG. 4 is a circuit diagram showing additional details of termination circuit 70. Termination circuit 70 receives telephone line 69, which is shown in greater detail in FIG. 4. As shown, telephone line 69 includes a tip portion 102 and a ring portion 104. Tip and ring portions 102, 104 couple to termination circuit 70. In this example, termination circuit 70 comprises a resistor coupled to two pairs 106, 108 of resistor/capacitor combinations. As illustrated, in this embodiment, resistor/capacitor combination 106 comprises a resistor in series with capacitor 96. Resistor/capacitor combination 108 comprises a resistor 98 in series with a capacitor 100. In general, the design of termination circuit 70 is based on the characteristic impedance of telephone line 18 connected to customer premises 14, and should match as closely as possible that characteristic impedance. In one common example associated with a common telephone wire in the United States, the values of resistors 92, 94, 98, and capacitors 96 and 100 are as follows: resistor 92=698 ohms; resistor 94=348 ohms; resistor 98=200 ohms; capacitor 96=0.033 µF; capacitor 100=0.015 µF.

FIG. 5 is a flowchart showing example steps associated with a method for performing a self-test on a line card, such as line card 22. The method begins at step 120. At a step 122 termination network 70 is coupled connector 68. As described above, termination network 70 may be any suitable network for terminating line card 22; however, termination networks having an impedance approximating the characteristic impedance of telephone line 18 in conjunction with customer premises 14 produce more accurate results. At a step 124, switch 66 is closed, allowing a transmitted signal to flow to termination circuit, if the components of line card 22 are operating properly. At a step 125, switches 59 and 47 are positioned at desired positions, depending on the components that are desired to be tested. Example positionings of these switches and the resulting signals that are expected are described in greater detail below with respect to Table 1.

At a step 126, a transmit signal is transmitted through at least a portion of transmit channel 39. At a step 128, any resulting signal is detected in receive channel 41 by, in this embodiment, digital signal processor 32. As described above digital signal processor 32 has functionality for receiving signals from customer premises 14 and analyzing those signals, including performing a frequency analysis. According to the teachings of the invention, this functionality may be used for self-testing line card 22 by examining any resulting signal in receive channel 41 by the DSP. The method concludes at step 130.

Examples associated with the method of FIG. 5 are described below in conjunction with Table 1.

TABLE 1

| | Example Tests | | | |
|---|---|---|---|---|
| Case | Switch 59 | Switch 47 | Switch 66 | Tests of |
| 1 | 54 (Normal) | 56 (Test) | Open | shape of filter 48 |
| 2 | 54 (Normal) | 56 (Test) | Closed | hybrid 60, transformer 64, switch 66, or connector 68 |
| 3 | 46 (Test) | 53 or 55 (DMT or CAP) | Open | filter 50 or 52 |
| 4 | 46 (Test) | 56 (Test) | Open | amplifier 56, hybrid 30, amplifier 58, or transformer 64 |
| 5 | 46 (Test) | 56 (Test) | Closed | amplifier 56, hybrid 30, transformer 64, switch 66, or connector 68 |

With reference to "Case 2" of Table 1, one test is described. Switch 59 is set to node 54, which represents a normal operating condition in which transmitted signals through channel 39 flow through filter 48. In this example, switch 47 is set to node 56, which represents a test condition in which filters 50 and 52 are bypassed. Also in this example, switch 66 is closed. When in this configuration a transmit signal is transmitted through transmit channel 39. If all components are operating properly, the transmit signal flows through filter 48 through amplifier 56 through hybrid 60 toward transformer 64. The signal continues through transformer 64, through closed switch 66, through connector 68, to termination circuit 70. The transmit signal then is absorbed in termination circuit 70 and no signal is reflected back through receive channel 41 to DSP 32. Therefore, no signal is detected in receive channel 41, assuming all components are operating properly. If however a reflected signal is detected, this indicates that either hybrid 60, transformer 64, switch 66, or connector 90 are malfunctioning and have caused reflection of the signal transmitted through transmit channel 39. Additionally, it may be possible to determine if amplifier 56 is causing distortion of the transmitted signal by observing any distortion in any reflected signal received in receive channel 41.

With respect to "Case 5" of Table 1, switches 66 and are in the same positions; however, switch 59 is coupled to node 46, indicating a test position. Assuming all components are operating properly, the signal propagates through transmit channel 39, through node 46, bypassing filter 48, and through amplifier 56, hybrid 60, transformer 64, switch 66, connector 68, and terminates in termination circuit 70. Thus, no resulting signal should be detected in receive channel 41 if all components are operating properly. However, if a signal is detected, this indicates that either hybrid 60, transformer 64, switch 66, or connector 68 is malfunctioning and might be open. Additionally, it may be possible to determine if amplifier 56 is causing distortion of the transmitted signal by observing any distortion in any reflected signal received in receive channel 41.

Other combinations of switches 59, 47, and 66 may also be used, if desired to form other various tests in an analogous matter.

FIG. 6 is a block diagram showing yet another method for self-testing line card 22 according to the teachings of the invention. The method begins at a step 140. At a step 142, switch 66 is opened. In this example, it is irrelevant whether a termination circuit is coupled to tip in ring 69. At a step 143, switches 59 and 47 are set to desired positions, such as the positions described below in connection with Table 1. At a step 144, a transmit signal is transmitted through at least a portion of transmit channel toward combined channel 43. At a step 146, any resulting signal is detected in receive channel 41. The method concludes at step 140.

This method allows the testing of various components of line card 22 without the use of an expensive spectrum analyzer. In a manner analogous to the method described in conjunction with FIG. 5, any signal detected at 146 may detected by DSP 32 of line card 22. Examples of various settings of switches 59 and 47 and the resulting expected signals are described below in conjunction with Table 1.

Referring to "Case 1" of Table 1, the following switch positions are used: Switch 59 is switched to node 54, indicating a normal operating condition in which a transmit signal is sent through filter 48; switch 47 is set to a node 56, indicating a test position in which filters 50 and 52 are bypassed; and switch 66 is set to open. Assuming all components are operating properly, a transmitted signal transmitted through transmit channel flows through filter 48, amplifier 56, hybrid 60, transformer 64, and is then reflected by the open switch and the reflected signal flows back through transformer 64 and hybrid 60 toward receive channel 41, progressing through amplifier 58, through node 56 to analog-to-digital converter 40 and eventual receipt and detection by DSP 32. DSP 32 can compare the received signal to the expected signal. The expected signal is simply the shape of filter 48. Such a test allows testing of filter 48.

With respect to "Case 3" switch 59 is placed to node 46, indicating a test condition and bypassing filter 48; switch 47 is set to either node 53 or 55, indicating that a receive signal will go through one of filters 50 and 52; and switch 66 is set to an open position. Assuming all components are operating properly, a transmitted signal transmitted through transmit channel 39 flows through test node 46, bypassing filter 48, through amplifier 56, through hybrid 60 toward transformer 64, through transformer 64 and is then reflected by an open switch 66 through hybrid 60 toward amplifier 58 and receive channel 41 and through either filter 50 or 52, depending on the selection of switch 47, for eventual reception by analog-to-digital converter 40 and detection by digital signal processor 32. Such a test allows testing of either filter 50 or 52 because DSP 32 can determine if the signal it received as a result of the test is a signal expected.

With respect to "Case 4" switch 59 is coupled to node 46, indicting bypassing of filter 48; switch 47 is coupled to node 56 indicating bypassing of filters 50 and 52; and switch 66 is set to open. Assuming all components are operating properly, a signal transmitted through transmit channel 39 flows through node 46, through amplifier 56, through hybrid 60, through transformer 64 and is reflected by open switch 66 back through transformer 64, back through hybrid 60 toward amplifier 58, and through node 56 for receipt by analog-to-digital converter 40 and DSP 32. The expected signal at DSP 32 should be simply the transmitted signal transmitted through transmit channel 39. If a signal other than the transmitted channel is received or if no reflected signal is received, this indicates a malfunction of amplifier 56, amplifier 58, or hybrid 30. If the received signal shows distortion, this indicates a malfunction in either amplifier 56, amplifier 58, or transformer 64.

Other combinations of switches 59, 47, and 66 may be utilized to perform other self-tests if desired, and the above cases were provided for example purposes only.

Additionally, and in some embodiments, filtering, such as filtering performed by filters 48, 50, and 52 is performed within DSP 32 rather than as a part of discrete analog front end 28. In such a case, such filters could also be tested in an analogous manner, with appropriate switching performed within DSP 32. In such a context or other analogous context, transmit channel 39 and receive channel 41 include the corresponding channels within DSP receiving or transmitting such signals.

Thus, an embodiment of an invention that allows self-testing without the use of expensive equipment of portions of a line card has been provided. By reducing the need for expensive test equipment, not only is cost saved but time associated with connecting the test equipment to each individual line card is saved.

Although the present invention has been described with several example embodiments, various changes and modifications may be suggested to one skilled in the art. It is intended that the present invention encompass those changes and modifications as they fall within the scope of the claims.

What is claimed is:

1. A method comprising:
   providing a line card having:
   a digital signal processor for manipulating data received by the line card;
   a transmit channel and a receive channel coupled to a combined transmit and receive channel, the combined transmit and receive channel for transmitting and receiving communications with the line card;
   wherein the transmit channel comprises a first amplifier for amplifying a signal in the transmit signal and the receive channel comprises a second amplifier for amplifying a signal in the receive channel;
   one or more electrical components in the combined channel;
   a switch disposed in the combined channel;

terminating the combined channel with a termination network, the termination network having a desired impedance;

transmitting a test signal through at least a portion of the transmit channel toward the combined channel;

determining whether any filters in the transmit channel or receive channel are malfunctioning by detecting, by the digital signal processor, any resulting signal in the receive channel;

wherein the desired impedance is approximately equal to a characteristic impedance of a communication line conventionally used with the line card; and wherein the characteristic impedance is 100 ohms.

2. The method of claim 1, wherein the transmit channel and the receive channel are coupled to the combined channel by a hybrid.

3. The method of claim 1, wherein the one or more electrical components comprises a transformer.

4. The method of claim 1, wherein the one or more electrical components comprises a connector.

5. The method of claim 1, wherein transmitting a test signal through at least a portion of the transmit channel toward the combined channel further comprises transmitting a test signal to the termination network.

6. The method of claim 5, wherein detecting, by the digital signal processor, any resulting signal in the receive channel comprises detecting a signal reflected by the termination network.

7. The method of claim 1, wherein detecting, by digital signal processor, any resulting signal in the receive channel comprising detecting no reflected signal from the termination network.

8. The method of claim 1, wherein detecting, by digital signal processor, any resulting signal in the receive channel comprising detecting a signal reflected by one of the one or more components.

9. The method of claim 1, and further comprising filtering, within the transmit channel, the transmitted signal.

10. The method of claim 1, and further comprising filtering, within the receive channel, any reflected signal.

11. The method of claim 1, and further comprising terminating, by the switch, any test signal in the combined channel and then again detecting, by digital signal processor, any resulting signal in the receive channel.

12. The method of claim 1, and further comprising comparing the detected signal to an expected signal.

13. The method of claim 1, wherein the termination network is formed on the line card.

14. The method of claim 1, wherein the termination network is formed external to the line card.

15. A method for self-testing a portion of a line card having a transmit channel and a receive channel coupled to a combined transmit and receive channel and also having a digital signal processor for manipulating data received by the line card, the method comprising:

transmitting a test signal through at least a portion of the transmit channel toward the combined channel;

determining whether any filters in the transmit channel or receive channel are malfunctioning by detecting, by the digital signal processor, any resulting signal in the receive channel; and introducing a reflection in the combined channel.

16. The method of claim 15, and further comprising detecting, by the digital signal processor, any resulting signal in the receive channel to determine whether any components in the combined channel are malfunctioning.

17. The method of claim 15, and further comprising comparing the detected signal to an expected detected signal.

18. The method of claim 17, further comprising filtering the test signal within the portion of the transmit channel.

19. The method of claim 18, wherein comparing the detected signal comprises comparing the detected signal to the filtered test signal.

20. The method of claim 15, and further comprising introducing an open in the combined channel.

21. The method of claim 15, and further comprising providing a switch in the combined channel.

22. The method of claim 21, and further comprising selectively opening the switch to test the filters.

23. The method of claim 15, and further comprising shorting the combined channel to itself.

24. A method for self-testing a portion of a line card having a digital signal processor for manipulating data received by the line card, a transmit channel, and receive channel, and a combined transmit and receive channel coupled to the transmit and receive channels, the method comprising:

terminating the combined channel with a termination circuit, the termination circuit having an impedance and comprising one or more resistors and one or more capacitors;

transmitting a test signal through a portion of the transmit channel toward the combined channel;

selectively opening a switch within the combined channel;

detecting, by the digital signal processor, any resulting signal in the receive channel after opening of the switch to determine whether a transmit channel filter or one or more receive channel filters are malfunctioning; and wherein the receive channel comprises the one or more receive channel filters and a filter bypass, and further comprising selecting, by a second switch, a path for the resulting signal through either one of the receive channel filters or the filter bypass.

25. The method of claim 24, and further comprising detecting, by the digital signal processor, any resulting signal in the receive channel after opening or closing of the switch to determine whether any components in the combined channel are malfunctioning.

26. The method of claim 24, wherein the transmit channel comprises the transmit channel filter and a filter bypass, and further comprising selecting, by a third switch, a path for the test signal.

27. The method of claim 24, and further comprising comparing the detected signal to the test signal.

28. The method of claim 24, and further comprising comparing the detected signal to an expected detected signal.

29. A system for allowing self-test of a line card comprising:

a line card comprising:

a transmit channel and a receive channel coupled to a combined transmit and receive channel, the combined transmit and receive channel operable to transmit and receive communications with the line card;

a termination circuit operable to terminate the combined channel;

a switch on the line card operable to selectively couple the termination circuit to the combined channel; and a digital signal processor formed on the line card and operable to manipulate data formed on the line card, the digital signal processor coupled to the receive channel and operable to determine whether a transmit channel filter or one or more receive channel filters are malfunctioning by detecting any reflection of a signal transmitted through the transmit channel toward the combined channel; and wherein the transmit channel comprises the transmit channel filter and an associated switch operable to bypass the transmit channel filter.

30. The system of claim 29, wherein the impedance of the termination circuit is approximately equal to a characteristic impedance associated with a telephone line.

31. The system of claim 29, wherein the combined channel comprises one or more electrical components to be tested.

32. The system of claim 31, wherein the one or more electrical components comprises a transformer.

33. The system of claim 29, wherein the transmit channel and receive channel are coupled to combined channel by a hybrid.

34. A method for self-testing a portion of a line card having a digital signal processor for manipulating data received by the line card, a transmit channel, and receive channel, and a combined transmit and receive channel coupled to the transmit and receive channels, the method comprising:

terminating the combined channel with a termination circuit;

transmitting a test signal through a portion of the transmit channel toward the combined channel;

selectively opening a switch within the combined channel;

determining whether a transmit channel filter or one or more receive channel filters are malfunctioning by detecting, by the digital signal processor, any resulting signal in the receive channel after opening of the switch; and wherein the transmit channel comprises the transmit channel filter and a filter bypass, and further comprising selecting, by a second switch, a path for the test signal.

35. A system for allowing self-test of a line card comprising:

a line card comprising:

a transmit channel and a receive channel coupled to a combined transmit and receive channel, the combined transmit and receive channel operable to transmit and receive communications with the line card;

a termination circuit operable to terminate the combined channel; and a switch on the line card operable to selectively couple the termination circuit to the combined channel;

a digital signal processor formed on the line card and operable to manipulate data formed on the line card, the digital signal processor coupled to the receive channel and operable to determine whether any filters in the transmit channel or receive channel are malfunctioning by detecting any reflection of a signal transmitted through the transmit channel toward the combined channel.

36. The method of claim 1, further comprising determining which, if any, of the filters in the transmit channel or receive channel are malfunctioning by detecting, by the digital signal processor, the any resulting signal in the receive channel.

37. The method of claim 15, further comprising determining which, if any, of the filters in the transmit channel or receive channel are malfunctioning by detecting, by the digital signal processor, the any resulting signal in the receive channel.

38. The method of claim 24, further comprising determining which, if any, of the transmit channel filter or the one or more receive channel filters are malfunctioning by detecting, by the digital signal processor, the any resulting signal in the receive channel after the opening of the switch.

39. The system of claim 29, wherein the digital signal processor is further operable to determine which, if any, of the transmit channel filter or the one or more receive channel filters are malfunctioning by detecting the any reflection of the signal transmitted through the transmit channel toward the combined channel.

40. The method of claim 34, further comprising determining which, if any, of the transmit channel filter or the one or more receive channel filters are malfunctioning by detecting, by the digital signal processor, the any resulting signal in the receive channel after the opening of the switch.

41. The system of claim 35, wherein the digital signal processor is further operable to determine which, if any, of the filters in the transmit channel or receive channel are malfunctioning by detecting the any reflection of the signal transmitted through the transmit channel toward the combined channel.

* * * * *